Figure 1:
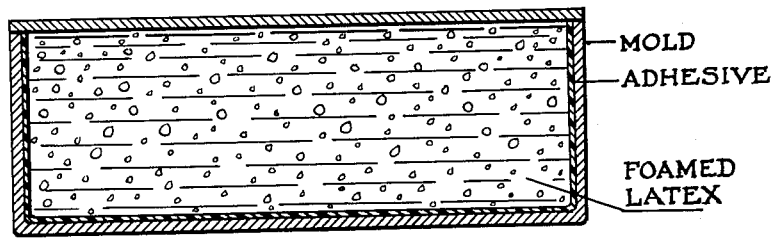

July 19, 1949.   L. A. WOHLER ET AL   2,476,827
PROCESS OF MOLDING RUBBER SPONGES Filed Aug. 16, 1946

INVENTORS
Leonard A. Wohler
and
BY Harold W. Greenup

ATTORNEYS

Patented July 19, 1949

2,476,827

UNITED STATES PATENT OFFICE 2,476,827

PROCESS OF MOLDING RUBBER SPONGES

Leonard A. Wohler, Akron, Ohio, and Harold W. Greenup, Barrington, R. I., assignors to The Firestone Tire & Rubber Company, Akron, Ohio, a corporation of Ohio Application August 16, 1946, Serial No. 691,172

4 Claims. (Cl. 18—47)

This invention relates to the curing of a foamed latex by a process which gives an improved sponge product. The latex may be either latex of natural rubber or latex of a synthetic rubber.

In the curing of foamed latices by the usual methods, difficulty has been experienced due to the tendency of the foam being cured to break away from the mold surface during gelling or curing, causing a distorted article to be produced. This difficulty has been encountered in the curing of foamed natural latices and foamed synthetic latices. The difficulty is so common that in the art the defect in the sponge products produced is referred to as gel shrinkage.

According to this invention, this difficulty is overcome by using a particular type of adhesive on the mold surface prior to filling the mold with the foamed latex. The adhesive used is an organic chemical or organic composition which is immiscible with water. It is soluble, at least to some extent, in the heated sponge produced so that on curing, it dissolves into the sponge and is thus at least largely removed from the surface of the mold and also from the surface of the sponge product. A variety of adhesives are suitable for the purpose, such as ester gums, including ester gum itself, hydrogenated ester gum, dehydrogenated ester gum, and disproportionated ester gum; rosins, such as rosin itself, hydrogenated rosin, dehydrogenated rosin, and disproportionated rosin; pine tar; etc. (Disproportionated rosin and ester gum are the products resulting from heating the rosin or ester gum with a catalyst which causes migration of hydrogen from some of the molecules to others. By such disproportionation some of the molecules are hydrogenated and thus stabilized at the expense of hydrogen liberated from other molecules which thus become stabilized.) Resins, such as ester gum and rosin, will be used in solution, such as for example, a solution containing from about ½ to 10 per cent of the resin in a volatile solvent. Pine tar and the like may be used without diluent or solvent although such may be added to aid in the application of the pin tar and to enablue a thin coating to be applied.

The invertion w.ll be further described in connection with the preparation of a molded sponge product, such as the cushion for a chair seat, to be cured in an aluminum mold. The foamed latex for the chair seat was prepared by mixing two preparations having the following formulae:

Formula A

Natural latex solids (in 62½% aqueous latex)
parts__ 100
Sulfur in 50% aqueous dispersion ____do____ 2
Piperidinium pentamethylene dithiocarbamate (in 40% aqueous dispersion) __part__ 0.5
Mercaptobenzothiazole _____do____ 0.5
Sym. di-beta naphthyl paraphenylene diamine _____part__ 1
Water _____ sufficient to yield composition with 57% solids content

Formula B

Parts
Ammonium sulfate _____ 3
Zinc oxide in 40% aqueous dispersion _____ 5

The ingredients of Formula A were blended together and then whipped into a foam. Formula B, which serves as a gelling agent, was then added, and the mixture was introduced into the mold.

Prior to introducing the mixture into the mold, the molding surface was coated with a solution of 2 parts of ester gum in 100 parts of carbon tetrachloride. The solution was swabbed onto the mold but might have been applied by dipping or spraying, etc. The solvent was allowed to evaporate from the dope before the foam was introduced into the mold. The mold need not be constructed of aluminum but might, for example, be formed of steel, a metal plated with chromium, aluminum alloy, etc., or a nonmetal, such as glass, etc.

When the mold was filled with the latex, it was first allowed to set for 12 minutes. It was then subjected to an open steam cure at 100° C. for 35 minutes. When the mold was opened, the sponge article was found not to be collapsed away from the molding surface, as would frequently have been the case had no ester gum been used; but, nevertheless, the article stripped readily from the mold. There was only a slight trace of the adhesive left on the molding surface or on the sponge product.

Formulae for synthetic foamed latices are:

Neoprene foamed latex

| | |
|---|---|
| Neoprene latex | 100 |
| 50% sulfur dispersion | 2 |
| 40% agerite white dispersion | 1 |
| 50% trimene base solution | 2 |
| 35% castor-oil-soap emulsion | 2 |
| 40% zinc oxide dispersion | 3 |

The agerite white is N,N'-dibetanaphthyl p-phenylenediamine. The trimene base is triethyl trimethylenetriamine. This latex contains 57 per cent solids. After foaming, 2 parts of sodium silico-fluoride were added as gelling agent. Ester gum was satisfactory for use as an adhesive to prevent mold shrinkage.

GR-S foamed latex

| | |
|---|---|
| GR-S latex | 100 |
| 40% Pip-Pip dispersion | 1.5 |
| 50% sulfur dispersion | 2 |
| 40% agerite white dispersion | 1.5 |
| 40% zinc oxide dispersion | 3 |
| 50% trimene base solution | 3 |
| 35% castor-oil-soap emulsion | 1 |

The Pip-Pip is piperidine pentamethylene dithiocarbamate. The solids content of the compounded latex is 52 per cent. After foaming, 2 parts of sodium silico-fluoride were added to gel the foam. Ester gum was used satisfactorily as an adhesive.

Other foamed, natural and synthetic latex compositions including latices of other synthetic rubbers may be employed. Any method of producing the foamed latex is satisfactory, provided the continuous phase be an aqueous solution. The important thing is that the coating for the mold cavity be an adhesive of organic composition immiscible with water and, therefore, not soluble in the latex but soluble in the molded sponge while hot so that at least some of it is dissolved during the curing operation.

Figure 2:
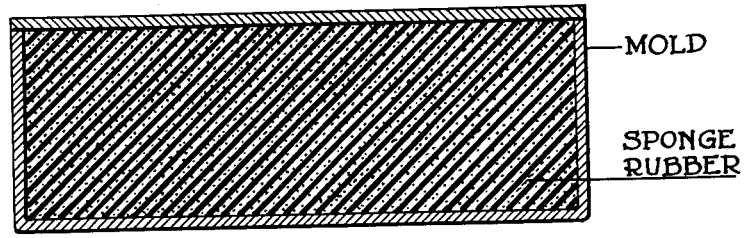

The invention is illustrated in the accompanying drawings, both of which illustrate a cross-section through the mold and its contents. Figure 1 is a section taken before curing and shows the adhesive between the foamed latex and the mold. Figure 2 illustrates the same after curing and shows that the adhesive has disappeared. It is dissolved in the cured sponge.

Thus, the disclosure is capable of variation without departing from the scope of the invention as defined in the appended claims.

What we claim is:

1. The process of producing in a mold a sponge rubber product from a foamed latex of the class consisting of natural and synthetic rubber latices which comprises applying to the molding surface of the mold a water-immiscible, hot-sponge-rubber-soluble adhesive of the class consisting of ester gum, hydrogenated ester gum, dehydrogenated ester gum, disproportionated ester gum, rosin, hydrogenated rosin, dehydrogenated rosin, disproportionated rosin and pine tar, putting into the mold foamed latex and thereby holding it to said molding surface prior to curing, then heating the foam to cure the rubber whereby the adhesive becomes dissolved at least to some extent in the cured sponge produced and the sponge product whose contour complements that of the molding surface thereby becomes easily separable from said molding surface, and then separating the cured sponge from said molding surface.

2. The process of producing in a mold a sponge rubber product from a foamed latex of the class consisting of natural and synthetic rubber latices which comprises applying ester gum to the molding surface of the mold, pouring the foamed latex into the mold and then heating the foam to cure the rubber, whereby the ester gum holds the foamed latex to the surface of the mold prior to curing and on curing at least some of the ester gum is dissolved into the hot sponge produced and there is obtained a sponge product with a contour which complements that of the molding surface, and then separating the cured sponge product from said molding surface.

3. The process of producing in a mold a sponge rubber product from a foamed latex of *Hevea brasiliensis* which comprises coating the molding surface of the mold with a solution of an ester gum in a volatile solvent, allowing the solvent to evaporate, then filling the mold with the foamed latex, and then heating the foam to cure the rubber, thereby preventing separation of the foamed latex from the molding surface prior to curing and on curing dissolving at least some of the ester gum coating from the molding surface into the hot sponge whereby there is obtained a cured sponge product with a contour which complements that of the molding surface, and then separating the cured sponge product from said molding surface.

4. The process of producing in a mold a sponge rubber product from a foamed latex of a synthetic rubber which comprises coating the molding surface of the mold with a solution of an ester gum in a volatile solvent, allowing the solvent to evaporate, then filling the mold with foamed latex, and then heating the foam to cure the rubber thereby preventing separation of the foamed latex from the molding surface prior to curing and on curing and subsequently dissolving at least some of the ester gum coating from the molding surface into the hot sponge whereby there is obtained a cured sponge product with a contour which complements that of the molding surface, and then separating the cured sponge product from said molding surface.

LEONARD A. WOHLER.
HAROLD W. GREENUP.

REFERENCES CITED

The following references are of record in the file of this patent:

UNITED STATES PATENTS

| Number | Name | Date |
|---|---|---|
| 1,484,731 | Malm | Feb. 26, 1924 |
| 1,564,050 | Dickson | Dec. 1, 1925 |
| 1,862,740 | Edison | June 14, 1932 |
| 2,051,849 | Hanna | Aug. 25, 1936 |
| 2,227,809 | Greenup et al. | Jan. 7, 1941 |
| 2,308,971 | Carter | Jan. 19, 1943 |
| 2,394,327 | Niessen et al. | Feb. 5, 1946 |